(12) United States Patent
Yan (10) Patent No.: US 7,379,752 B2
(45) Date of Patent: May 27, 2008

(54) METHODS AND APPARATUS FOR COMMUNICATION IN A WIRELESS SYSTEM

(75) Inventor: Aiguo Yan, North Andover, MA (US)

(73) Assignee: MediaTek Inc. (TW)

( * ) Notice: Subject to any disclaimer, the term of this patent is extended or adjusted under 35 U.S.C. 154(b) by 422 days.

(21) Appl. No.: 10/964,576

(22) Filed: Oct. 13, 2004

(65) Prior Publication Data

US 2006/0079272 A1 Apr. 13, 2006

(51) Int. Cl.
*H04M 1/00* (2006.01)
*H04Q 7/20* (2006.01)

(52) U.S. Cl. .............................. 455/552.1; 455/553.1; 455/550.1

(58) Field of Classification Search ............. 455/552.1, 455/553.1, 550.1, 560, 561, 524, 525, 426.1, 455/436, 450, 103, 509, 179.1
See application file for complete search history.

(56) References Cited

U.S. PATENT DOCUMENTS

| | | | |
|---|---|---|---|
| 5,220,557 A | 6/1993 | Kelley | |
| 5,574,399 A | 11/1996 | Oura et al. | |
| 6,038,267 A | 3/2000 | Oura et al. | |
| 6,038,272 A | 3/2000 | Golden et al. | |
| 6,314,287 B1 * | 11/2001 | Leickel et al. | 455/426.1 |
| 6,487,410 B1 * | 11/2002 | Kontio et al. | 455/437 |
| 6,690,946 B1 * | 2/2004 | Ismert et al. | 455/552.1 |
| 6,859,488 B2 | 2/2005 | Azenkot et al. | |
| 6,999,527 B2 | 2/2006 | Chen | |
| 7,010,280 B1 | 3/2006 | Wilson | |
| 7,046,987 B2 | 5/2006 | Siegel et al. | |
| 7,095,803 B2 | 8/2006 | Gazsi et al. | |
| 7,136,432 B2 | 11/2006 | Min et al. | |
| 7,149,491 B2 | 12/2006 | Kawai et al. | |
| 7,272,125 B2 | 9/2007 | Hokao | |
| 2003/0021365 A1 | 1/2003 | Min et al. | |
| 2003/0031274 A1 | 2/2003 | Chen | |
| 2003/0078037 A1 | 4/2003 | Auckland et al. | |
| 2004/0037363 A1 | 2/2004 | Norsworthy et al. | |
| 2004/0037366 A1 | 2/2004 | Crawford | |
| 2005/0181822 A1 * | 8/2005 | Sasaki et al. | 455/552.1 |
| 2005/0239500 A1 | 10/2005 | Liu et al. | |
| 2005/0250514 A1 * | 11/2005 | Chen et al. | 455/456.1 |

(Continued)

FOREIGN PATENT DOCUMENTS

EP 0 973 271 A1 1/2000

(Continued)

OTHER PUBLICATIONS

Hogenauer E.B., "An Economical Class of Digital Filters for Decimation and Interpolation", IEEE Transactions on Acoustics, Speech and Signal Processing, Apr. 1, 1981, pp. 155-162, vol. 29, No. 2, IEEE Inc. New York, USA.

(Continued)

*Primary Examiner*—Sonny Trinh
(74) *Attorney, Agent, or Firm*—Fish & Richardson P.C.

(57) ABSTRACT

One embodiment of the invention is directed to operating, in a wireless network, a device that is designed for operation in a different wireless network. In one embodiment, a device designed to operate in a GSM wireless network may be used to communicate in a PHS wireless network.

7 Claims, 9 Drawing Sheets

U.S. PATENT DOCUMENTS

| | | | |
|---|---|---|---|
| 2005/0277436 A1* | 12/2005 | Lai et al. | 455/552.1 |
| 2006/0029171 A1 | 2/2006 | Jensen | |
| 2006/0030354 A1* | 2/2006 | Ho et al. | 455/552.1 |
| 2006/0077893 A1* | 4/2006 | Yan | 370/230 |
| 2006/0078068 A1* | 4/2006 | Yan | 375/316 |
| 2006/0083297 A1 | 4/2006 | Yan | |

FOREIGN PATENT DOCUMENTS

| | | |
|---|---|---|
| EP | 1 067 688 A2 | 1/2001 |
| WO | WO 00/31885 A1 | 6/2000 |
| WO | WO 00/65799 A1 | 11/2000 |
| WO | WO 02/01726 A2 | 1/2002 |
| WO | WO 03/073631 A1 | 9/2003 |

OTHER PUBLICATIONS

B. Sklar, "Digital Communications. Fundamentals and Applications", Bandpass Modulation and Demodulation, Chap. 4, 2001, pp. 194, 211-212, XP-002367099, Prentice Hall.

Uehara K. et al., "Design and Performance Evaluation of Software Defined Radio Prototype for PHS and IEEE802.11 Wireless LAN", Personal, Indoor and Mobile Radio Communications, 2002. The 13th IEEE International Symposium on Sep. 15-18, 2002, Piscataway, NJ, USA, IEEE, vol. 1, Sep. 15, 2002, pp. 452-457, XP010614266.

Uusikartano R. et al., "A low-power fractional decimator architecture for an IF-sampling dual-mode receiver", Circuits and Systems, 2004. ISCAS '04. Proceedings of the 2004 International Symposium on Vancouver, BC, Canada May 23-26, 2004, Piscataway, NJ, USA, IEEE, US, May 23, 2004, pp. III-589 to III-592, XP010719345.

Search Report dated Feb. 16, 2006 from International Application No. PCT/US2005/036946.

Search Report dated Feb. 27, 2006 from International Application No. PCT/US2005/036941.

Search Report dated Feb. 24, 2006 from International Application No. PCT/US2005/037090.

Search Report dated Jan. 25, 2006 from International Application No. PCT/US2005/036944.

Office Action dated Sep. 27, 2007 from U.S. Appl. No. 10/964,597.

Office Action dated Nov. 2, 2007 from U.S. Appl. No. 10/964,570.

* cited by examiner

Figure 1

| Slot 1 | Slot 2 | Slot 3 | Slot 4 | Slot 5 | Slot 6 | Slot 7 | Slot 8 |
|---|---|---|---|---|---|---|---|
| 201a | 201b | 201c | 201d | 201e | 201f | 201g | 201h |

METHODS AND APPARATUS FOR COMMUNICATION IN A WIRELESS SYSTEM

FIELD OF THE INVENTION

The present invention relates generally to wireless communications.

BACKGROUND OF THE INVENTION

The Personal Handyphone System (PHS) is a lightweight mobile communication system that makes use of the existing public telephone network by building upon the existing land line network. Because base stations in a PHS network have much smaller coverage radius than that of a typical cellular network and because PHS mobile units employ low-power transmitters, PHS is best suited for densely populated areas. PHS was originally deployed in Japan in the early 1990s and was intended to provide a low cost alternative to a cellular network. However, PHS was not a commercial success, as many subscribers were frustrated by the limited mobility, poor signal quality and limited ability to operate in moving vehicles.

In spite of the tepid public response in Japan, PHS has recently been deployed in other densely populated areas in Asia, in an attempt to provide a low-cost alternative to traditional wireless and landline communication networks.

However, given the lack of commercial success of PHS in Japan, hardware manufacturers have been reticent to invest large sums of money in the design and further development of PHS hardware (e.g., base station and mobile unit chipsets). Thus, it would be desirable to have wireless devices capable of operating in a PHS wireless system without the time and expense of the design and development of such devices.

SUMMARY OF THE INVENTION

One embodiment of the invention is directed to a method comprising: operating a circuit designed for operation in a first wireless system according to a first wireless standard, in a second wireless system that operates according to a second wireless standard, different from the first wireless standard.

Another embodiment of the invention is directed to a method of determining symbol boundaries of a wireless signal of a first wireless system that transmits at a first slot rate. The method comprising acts of: operating a circuit with a clock signal configured for operation with a second wireless system that transmits at a second slot rate to count a predetermined number of clock pulses of the clock signal to estimate a slot boundary, wherein the frequency of the clock signal is not an integer multiple of the first slot rate.

A further embodiment of the invention is directed to a method of utilizing, in a first wireless system, a wireless device designed to operate in a second wireless system, wherein the wireless device comprises a first component that transmits a signal to a second component over an interface having a data rate, wherein the date rate of the interface is not an integer multiple of a symbol rate of the first wireless system. The method comprises acts of: a) determining the data rate of the interface; b) determining the symbol rate of the first wireless system; c) based on the data rate and the symbol rate, determining a sampling rate that allows the signal to be transmitted over the interface at the symbol rate; d) based on the sampling rate, determining time intervals at which to sample the signal to achieve the sampling rate; and e) providing a fractional interpolator to estimate the signal value at the determined time intervals.

One embodiment of the invention is directed to a method of receiving a personal handyphone system (PHS) wireless signal. The method comprises: demodulating the received signal to generate a baseband waveform; filtering the baseband waveform using an unmatched channel selection filter; and extracting at least one PHS symbol from the baseband waveform by performing coherent detection of the baseband waveform.

DETAILED DESCRIPTION

One embodiment of the invention is directed to operating, in a PHS network, hardware that is designed to operate with a different cellular network (e.g., a GSM device). This may be done in any suitable way. For example, hardware designed to operate with another cellular network may be software programmed to operate with the PHS network.

Using hardware in a cellular network other than the network in which the hardware was designed to operate may present challenges because the cellular network may use a different timing scheme from the network in which the hardware was designed to operate.

For example, in many cellular networks, mobile units are synchronized in time to the base station of the cell in which the mobile units are located. This timing synchronization allows a mobile unit to transmit data at a time when the base station expects to receive data from the mobile unit and to expect to receive data from the base station at a time when the base station transmits the data.

Figure 1:
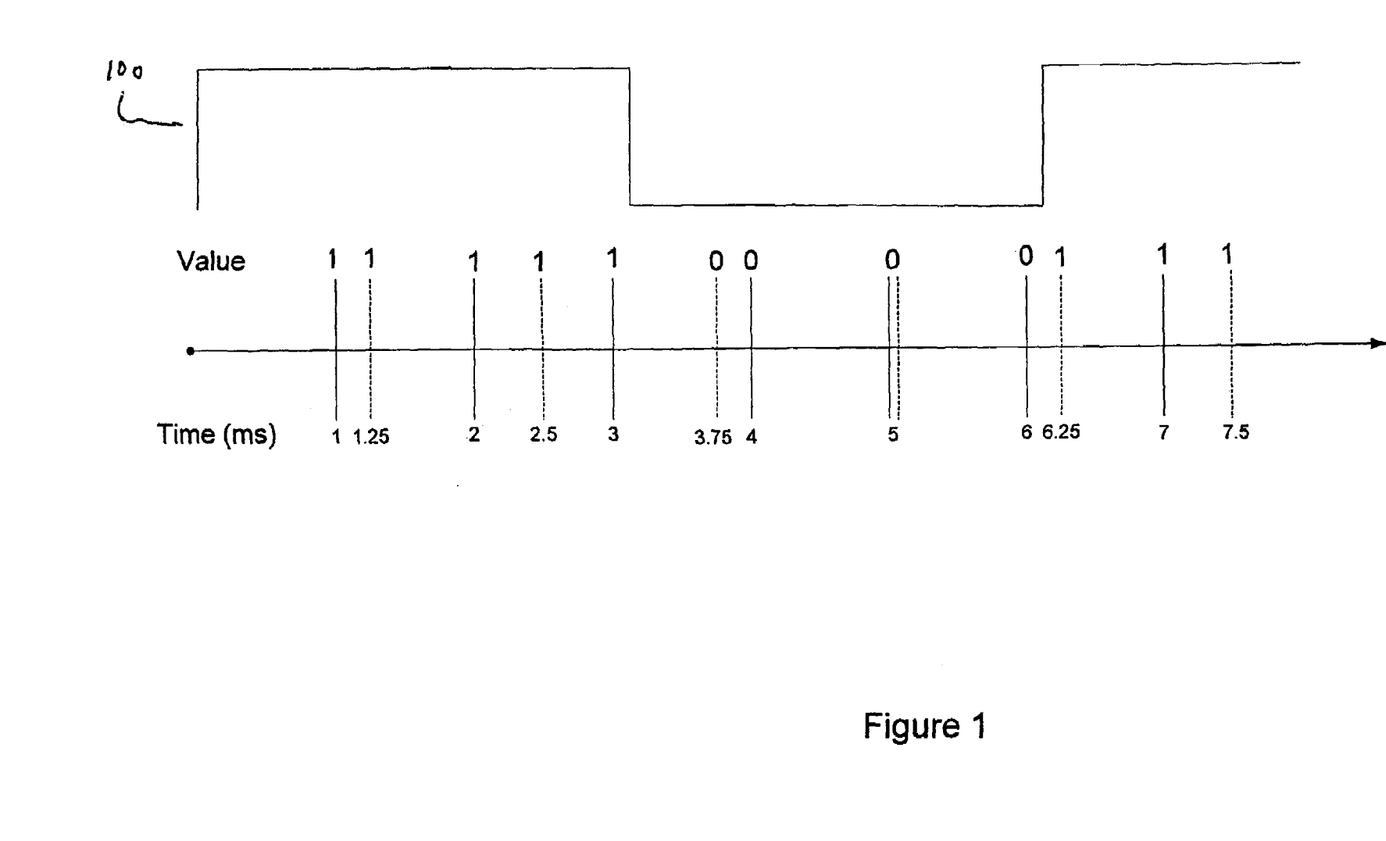
FIG. 1 is a timing diagram illustrating an example of the symbol values of a signal according to two different symbol rates, in accordance with one embodiment of the invention.

That is, for example, a base station of a first wireless system may transmit data to mobile units at a symbol rate of 1000 Hz and a base station of a second wireless system may transmit to mobile units at a symbol rate of 800 Hz. A mobile unit may determine the symbol boundaries, or sampling moments, (i.e., the points in the signal at which one symbol ends and the subsequent symbol begins) of a signal transmitted by the base station based on the symbol rate of the wireless system. If the mobile unit uses an incorrect symbol rate to determine the symbol boundaries of a signal, the sampled values of the signal may be incorrect. FIG. 1 shows the symbol boundaries of signal 100 for symbol rates of two different wireless systems. In FIG. 1, the symbol boundaries of a wireless system having a symbol rate of 1000 Hz are shown by a solid line and the symbol boundaries of a wireless system having a symbol rate of 800 Hz are shown by a dashed line. The signal boundaries of the 1000 Hz wireless system occur at 1 ms, 2 ms, 3 ms, 4 ms, 5 ms, 6 ms, and 7 ms. The signal boundaries for the 800 Hz wireless system occur at 1.25 ms, 2.5 ms, 3.75 ms, 5 ms, 6.25 ms, 7.5 ms. Thus, if a mobile station were to determine the value of signal 100 based on a symbol rate of 1000 Hz, signal 100 would have a binary value of '1110001', whereas if the mobile station were to determine the value of the signal based on a symbol rate of 800 Hz, the signal would have a binary value of '110011'.

Thus, as demonstrated in FIG. 1, it is important for the mobile unit to determine the correct symbol boundaries of a signal to determine the intended signal value. As such, one embodiment of the invention relates to modifying the timing scheme of hardware designed to operate in a first wireless network so that the hardware operates correctly in a second wireless network. For example, because a clock signal used to determine symbol boundaries of a wireless signal may not be capable of being generated by the master clock of a wireless device (e.g., due to the fact the device was designed to operate in a different wireless system), a clock signal having a resolution finer than that of symbol rate of the wireless signal may be generated by the wireless device and used to determine the symbol boundaries of the wireless signal. Although the determined symbol boundaries may not be the actual symbol boundaries of the signal, they are close enough to the actual symbol boundaries to be within tolerable error.

For example, the wireless standard for GSM wireless systems defines a symbol rate of 270.08$\overline{3}$ kHz. A GSM device (e.g., mobile unit or base station) may include a master clock which operates at a designated frequency and one or more programmable integer dividers. Other clock signals operating at different frequencies may be derived from the master clock signal, for example using the programmable integer dividers.

Because the master clock of many GSM devices operates at a frequency of 13 MHz, a clock signal having a frequency of the symbol rate of 270.08$\overline{3}$ kHz may be derived from the 13 MHz master clock using an integer divider that divides the master clock frequency by 48.

Similarly, the wireless standard for PHS systems defines a symbol rate of 192 kHz. The master clock of many PHS devices operates at frequency of 19.2 MHz, allowing a clock signal at a frequency of the symbol rate (i.e., 192 kHz) to be derived from the master clock by dividing the frequency of the master clock by 100.

However, if trying to operate a GSM device (e.g., a GSM mobile unit) in a PHS wireless system the PHS symbol rate of 192 kHz may not be derived from the GSM master clock operating at a frequency of 13 MHz using an integer divider. As shown in Table 1, deriving a 192 kHz clock from 13 MHz clock requires a division down by a non-integer factor of 67.708$\overline{3}$.

TABLE 1

$$\frac{13,000,000}{192,000} = 67.708\overline{3}$$

Figure 2:
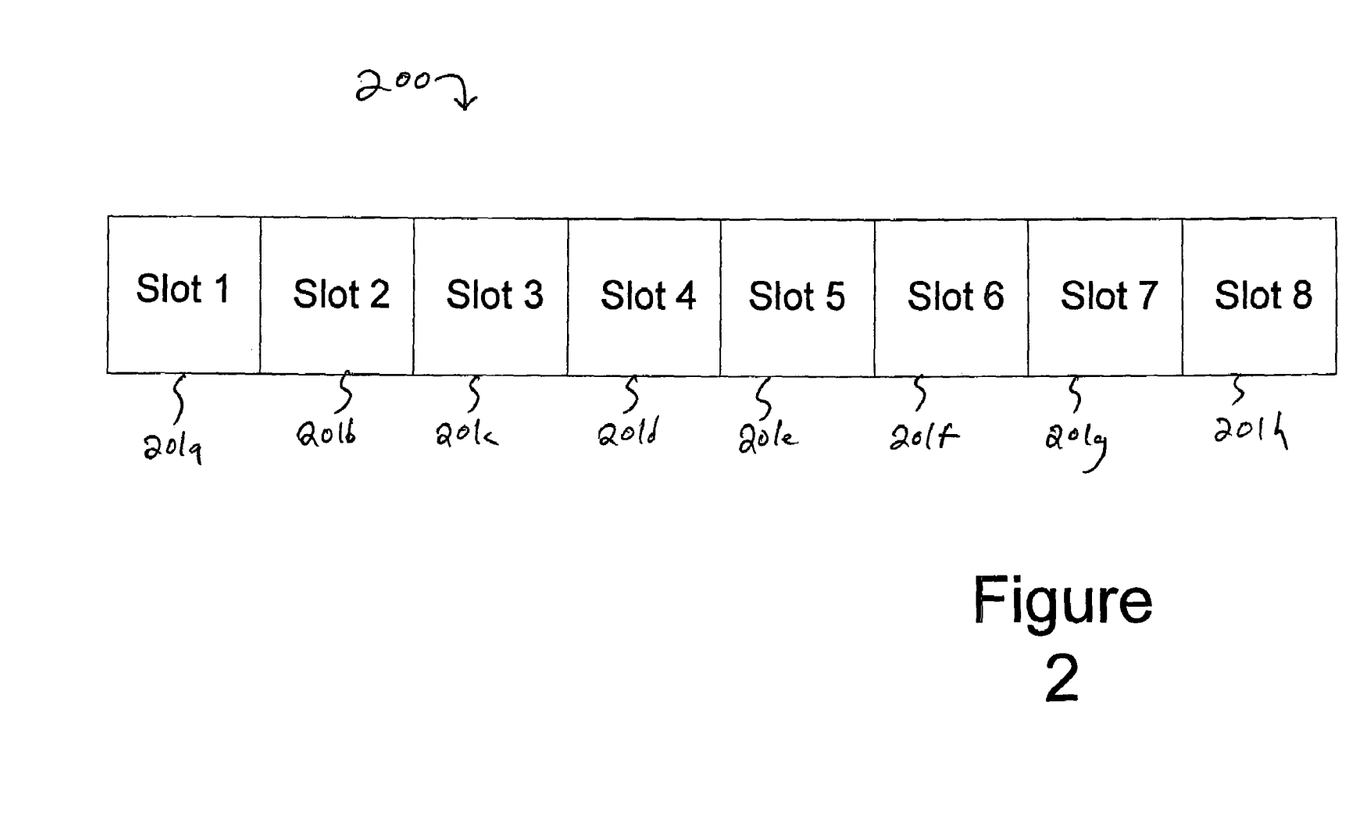
FIG. 2 is diagram illustrating an example of a radio frame suitable for use in embodiments of the invention.

However, in wireless systems such as PHS and GSM, time synchronization between a base station and a mobile unit is obtained by transmitting data in frames, slots and symbols. That is, a frame includes a plurality of slots and each slot in the frame includes a plurality of symbols. The mobile unit and base station synchronize based on the frame boundaries, slot boundaries, and symbol boundaries. As shown in FIG. 2, in PHS wireless systems, for example, a frame includes eight slots and each slot includes 120 symbols. The frame rate specified by the PHS standard is 200 Hz (i.e., 200 frames per second). Thus, the slot rate is 1600 Hz. Clock signals having frequencies of 200 Hz and 1600 Hz may be derived from a 19.2 MHz PHS master clock using an integer divider.

In one implementation of a GSM wireless device, the 13 MHz GSM master clock may be used to drive a software timing engine that generates clock signals for other components of a wireless device. The software timing engine may have a resolution of 6.5 MHz.

When using a GSM device in a PHS wireless system, a clock at the frequency of the PHS frame rate may be derived from the software timing engine, for example using a programmable integer divider. That is, as shown in FIG. 2, the 6.5 MHz clock from the software timing engine may be divided by a factor of 32,500 to achieve a clock signal having a frequency of 200 Hz.

TABLE 2

$$\frac{6,500,000}{32,500} = 200$$

Thus, the GSM device may use a 200 Hz clock signal derived from the 13 MHz master clock signal to determine the frame boundaries of a transmitted wireless signal. However, a clock signal having a frequency of 1600 Hz (i.e., the PHS slot rate) may not be derived from the 6.5 MHz clock using an integer divider.

In one embodiment of the invention, the software timing engine clock may be used to determine the slot boundary of a transmitted PHS signal. Although the software timing engine clock may not have a clock edge exactly on the slot boundary, the clock edge may be close enough to the slot boundary such that it is within acceptable error, as defined by the wireless standard.

Figure 3:
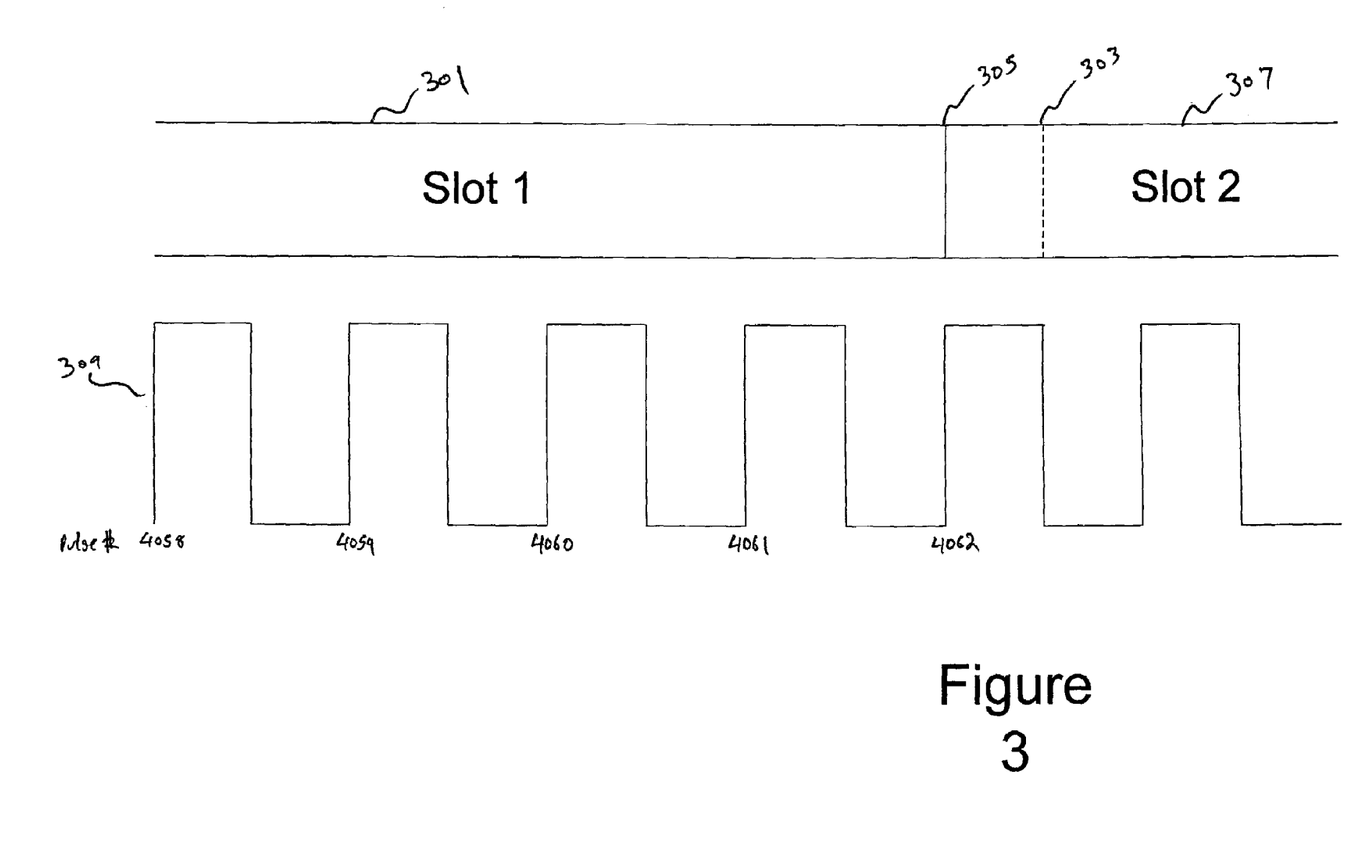
FIG. 3 is a diagram illustrating the selection of a symbol boundary between two PHS symbols, in accordance with one embodiment of the invention.

That is, for example, because the PHS slot rate is 1600 Hz there are 4062.5 clock pulses from the software timing engine clock in each PHS slot and there are 8125 clock pulses for every two PHS slots. For example, as shown in FIG. 3, a first PHS slot 301 and a second PHS slot 307 have an actual slot boundary shown at reference number 303.

Clock signal 309 is a portion of the clock signal generated by the software timing engine. The 4062$^{nd}$ counted pulse of the clock signal occurs just before the actual slot boundary 303. Thus, the slot boundary determined using clock signal 309 (i.e., slot boundary 305) occurs at just before actual slot boundary 303. However, because a clock pulse of clock signal 309 occurs every 0.153 μs, the determined slot boundary 305 is, at most, 0.153 μs before (or after) the actual slot boundary. As discussed above, the PHS symbol rate is 192 kHz and the duration of a PHS symbol is 5.24 μs. Consequently, the determined slot boundary may differ at most from the actual slot boundary by less than 3% of the duration of a PHS slot, as shown in Table 3.

TABLE 3

$$\frac{.153}{5.24} * 100 = 2.92\%$$

Because oscillators in mobile devices are often not perfectly accurate (e.g., due to crystal inaccuracy), some tolerance for error is often built in to a wireless system. For example, the PHS wireless system provides a tolerance of up to 25% of a symbol period for transmitters. The less than 3% worst-case error resulting from the use of the 6.5 MHz GSM timing engine clock signal is well within the accepted tolerance that is built into the wireless system. By using the GSM software timing engine clock to determine the slot boundary in a PHS transmitted signal, a device designed to operate in a GSM wireless system may be used in transmitters to generate PHS signals.

As discussed above, there are 8125 clock pulses for every two PHS slots. Thus, by counting 8125 pulses, the slot boundary of every other PHS slot may be determined.

Thus, in the example of FIG. 3, after clock pulse 4062 occurs, 4063 additional clock pulse may be counted to determine the next slot boundary. In this way, the error in determining slot boundary 303 does not accumulate to subsequent slot boundaries.

Although the example described above is directed to using a GSM device in a PHS wireless system, the invention is not limited in this respect, as the above-described technique for determining slot boundaries in a wireless signal using a clock signal having a frequency that is not an integer multiple of the slot rate of the wireless system may be employed in any wireless system.

Further, in the example described above, the GSM system is described as using a clock signal of 6.5 MHz, and the PHS system is described as using a master clock of 19.2 MHz. It should be appreciated that the clock frequencies of both the GSM clock and the PHS master clock may vary slightly from these values due to oscillator inaccuracy.

In addition, the invention is not limited to using a clock of 6.5 MHz to determine slot boundaries in a wireless signal having a symbol rate of 192 KHz. Indeed, any clock frequency and slot rate may be used in embodiments of the invention, where the clock frequency is not an integer multiple of the slot rate of the wireless signal and the clock frequency provides a fine enough resolution to determine the slot boundaries within tolerable error.

Further, in the example described above, some clock signals were described as being derived from the master clocks of the GSM system and the PHS system using programmable integer dividers. However, the invention is not limited in this respect as clock signals may be derived (e.g., divided down) from other clock signals in any suitable way. Further, in embodiments of the invention employing integer dividers, clock signals need not be divided down by a single integer divider, as the clock signal may be divided down to the desired frequency in stages by any suitable number of integer dividers.

Additionally, it should be appreciated that the techniques described above may be employed in both base stations and mobile units, as the invention is not limited in this respect.

Another obstacle that may be encountered when using a wireless device designed to operate in a first wireless system in a second wireless system is that the transmit path in the wireless device may be clocked at frequency designed to assist in transmission of a signal in the first wireless system, but that is not suitable for transmission of a signal in a second wireless system.

In this respect, one embodiment of the invention is directed to implementing the transmission path of the second wireless system in a device designed to operate with the first wireless system.

Figure 4:
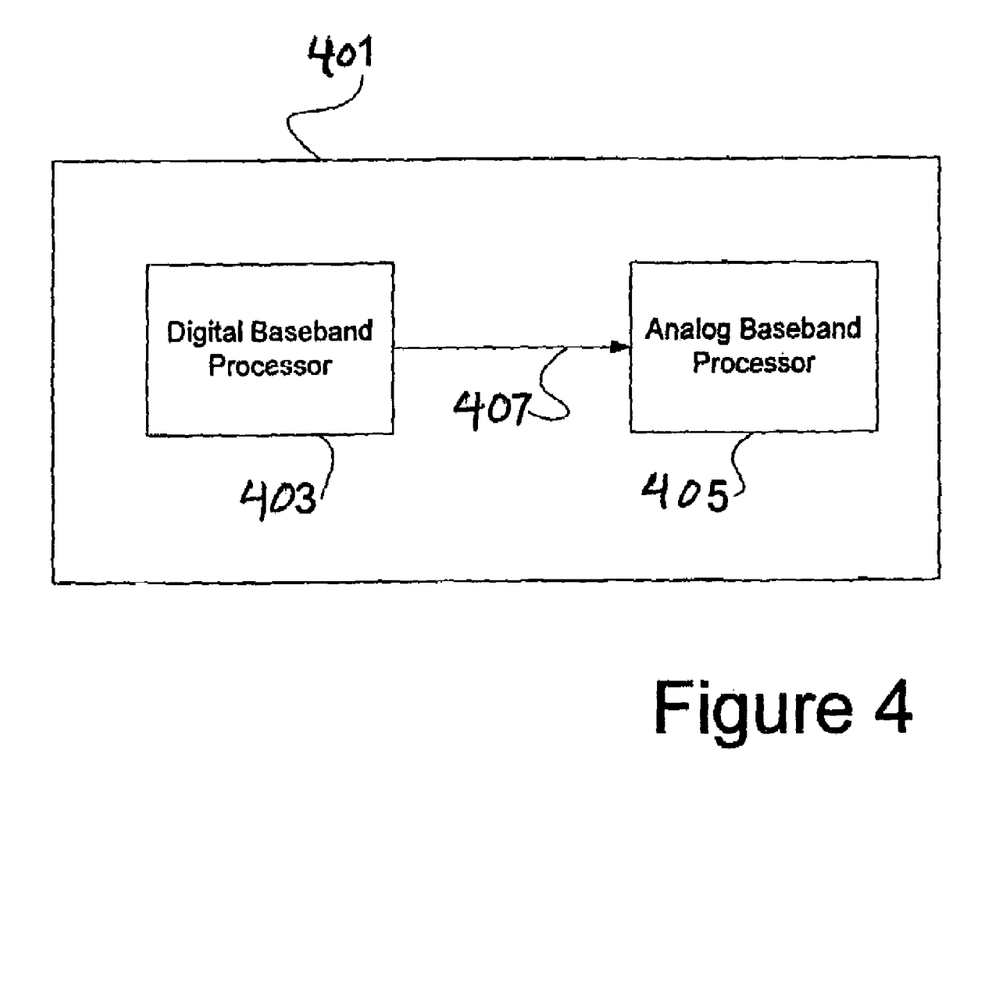
FIG. 4 is a block diagram of an example of a wireless device suitable for use in embodiments of the invention.

For example, in one embodiment of the invention, a mobile unit 401, shown in FIG. 4, includes a digital baseband processor 403 and an analog baseband processor 405. Digital baseband processor 403 may communicate with analog baseband processor 405 over interface 407. Digital baseband processor 403 may perform functions such as, for example, modulation and demodulation of digital signals, processing input from the mobile unit keyboard, power management, and other functions. Analog baseband processor 405 may perform functions such as analog-to-digital conversion, digital-to-analog conversion, filtering of analog and digital signals, and may serve as an interface between digital baseband processor 403 and the radio of mobile unit 401.

To transmit a signal, the signal may first be processed and modulated by digital baseband processor 403. The signal may then be sent to analog baseband processor 405 over interface 407. Analog baseband processor 405 may perform additional filtering, rate conversion, and digital to analog conversion of the signal and send the signal to the radio unit of mobile unit 401 for transmission.

In one embodiment, interface 407 may be designed to operate with a GSM wireless system and may therefore be clocked by the GSM master clock at 13 MHz. Thus, interface 407 transmits data at a rate of 13 Mbps. To sample a signal, both the in-phase (I) and quadrature (Q) components of the signal are sampled. Each of these component samples may include 8 bits, resulting in 16 bits for each signal sample. Thus, as shown in Table 4, the data rate of interface 7 is 812,500 samples/second.

TABLE 4

$$\frac{13,000,000 \text{ bits/sec}}{16 \text{ bits/sample}} = 812,500 \text{ samples/sec}$$

In GSM systems, the symbol rate designated by the GSM standard is 270.8$\overline{3}$ kHz, or 270,833.$\overline{3}$ symbols/sec. Thus, digital baseband processor may output data at a rate of 270,833.$\overline{3}$ symbols/sec. Sending data at this symbol rate over an interface clocked at a higher rate may be accomplished by sending multiple samples per symbol over the interface. As shown in Table 5, 3 samples/symbol may be sent to achieve a symbol rate of 270,833.3 symbols/sec over a 13 Mbps link.

TABLE 5

$$\frac{812,500 \text{ samples/sec}}{270,833.\overline{3} \text{ symbols/sec}} = 3 \text{ samples/symbol}$$

However, in PHS systems, the symbol rate designated by the PHS standard is 192,000 symbols/second. Transmitting data at this symbol rate over an interface clocked at 13 Mbps (i.e., interface 407) results a non-integer number of samples/symbol (i.e., 4.2318 symbols/sample) being sent over the interface, as shown in Table 6

TABLE 6

$$\frac{812,500 \text{ samples/sec}}{192,000 \text{ symbols/sec}} \approx 4.2318 \text{ samples/symbol}$$

Figure 5:
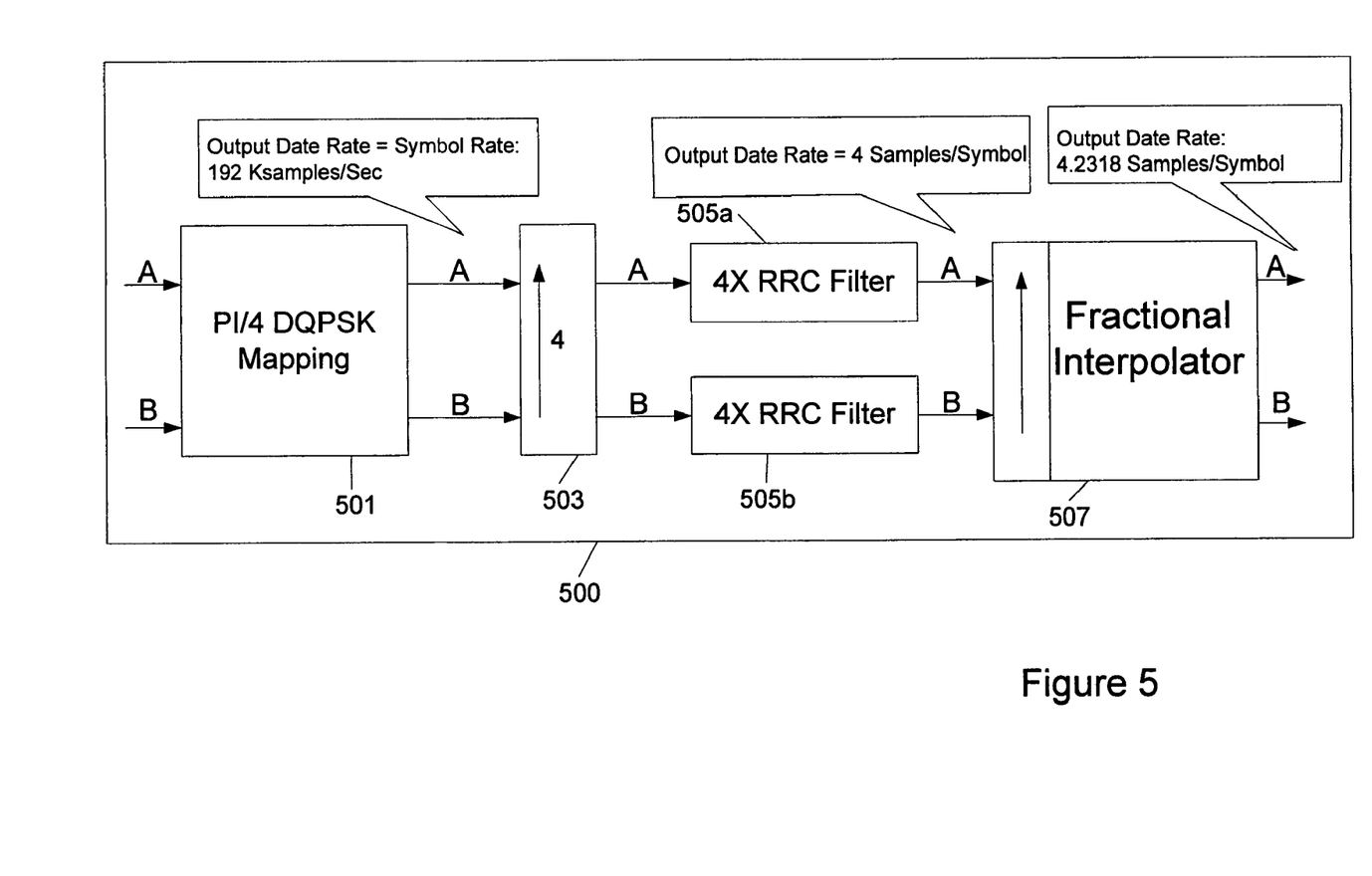
FIG. 5 is a block diagram of the functional units in the transmission path of a digital baseband processor, in accordance with one embodiment of the invention.

FIG. 5 is a block diagram illustrating functional components of Digital Baseband Processor 403. As shown in FIG. 5, modulator 500 in digital baseband processor 403 includes Pi/4-differential quadrature phase-shift keying (DQPSK) unit 501 that may perform modulation of signals. Root Raised Cosine (RRC) filters 505*a* and 505*b* may perform pulse shaping of signals and fractional interpolator 207 may performs fractional interpolation on signals output from filters 505*a* and 505*b*. There are separate signal paths through modulator 500 for the in-phase component (i.e., signal path A) and for the quadrature component (i.e., signal path B).

Oversampling unit 503 may oversample the output signal of Pi/4-DQPSK unit 501 by a factor of four. This allows transfer of data at the specified symbol rate over an interface that has a data rate greater than that of the symbol rate. For example, if the specified symbol rate was 4 symbols/second and the data rate of the interface was 16 samples/second, each symbol may be sampled 4 times and each of these samples may be transferred over the link. Thus, data may be sent over the interface at the rate of 16 samples/second, but only 4 symbols per second are transferred.

In one embodiment, functional components 501, 503, 505*a*, 505*b*, and 507 may be implemented in software executed by the digital baseband processor. However, the invention is not limited in this respect, as these functions may be performed by dedicated hardware, software, or any combination thereof.

Thus, for example, in the case of the PHS standard, wherein the specified symbol rate is 192 Ksymbols/second, oversampling the symbol by a factor 4 allows data to be sent over an interface with a rate of 768 Ksamples/second. A symbol rate of 192 Ksymbols/second results in one symbol being transferred every 5.2083 μs.

Figure 6:
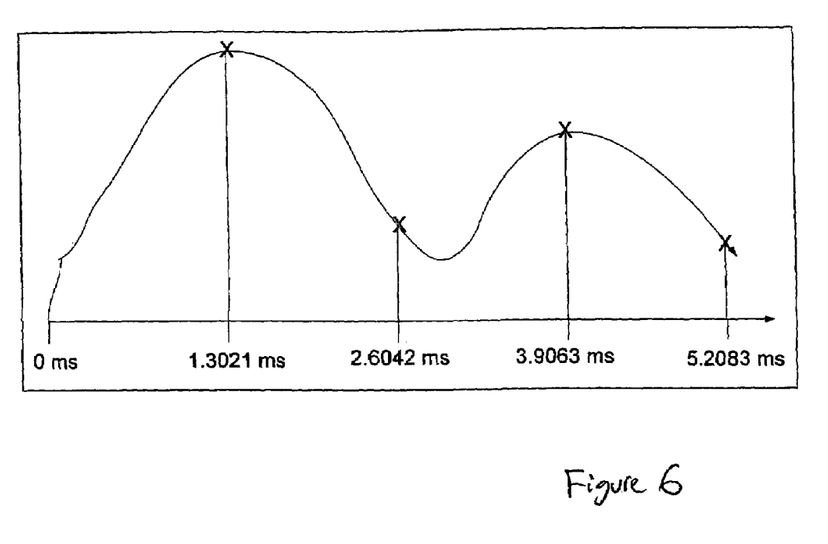
FIG. 6 is a timing diagram of an example of a PHS symbol, in accordance with one embodiment of the invention.

FIG. 6 illustrates an example of a PHS signal waveform over one symbol period. To transfer the symbol over an interface with a rate of 768 Ksamples/second, the symbol may be sampled every 1.3021 μs, resulting in four samples for the symbol. For example, as shown in FIG. 6, the symbol may be sampled at 1.3021 μs, 2.6042 μs, 3.9063 μs, and 5.2083 μs.

This may be achieved by transferring a different number of samples for various symbols so that the average number of samples/symbol for all symbols transferred is 4.2318. For example, for some symbols four samples may be transferred across the interface and for other symbols, five samples may be transferred.

As shown in Table 7, to achieve an average of 4.2318 samples/symbol, the signal may be sampled every 1.2308 μs. However, as shown in FIG. 6, the signal is oversampled by a factor of four, resulting in the signal being sampled every 1.3021 μs. The value of the signal at 1.2308 μs intervals may be determined by fractional interpolation.

TABLE 7

$$\frac{5.2083 \text{ μs/symbol}}{4.2318 \text{ samples/symbol}} = 1.2308 \text{ μs/sample}$$

This interpolation may be performed by fractional interpolator 507 of FIG. 5. Thus, the output data rate from fractional interpolator 507 is 4.2318 samples/symbol, which allows data to transferred over interface 407 at rate of 812,500 samples/second with a symbol rate of 192,000 symbols/second.

Figure 7:
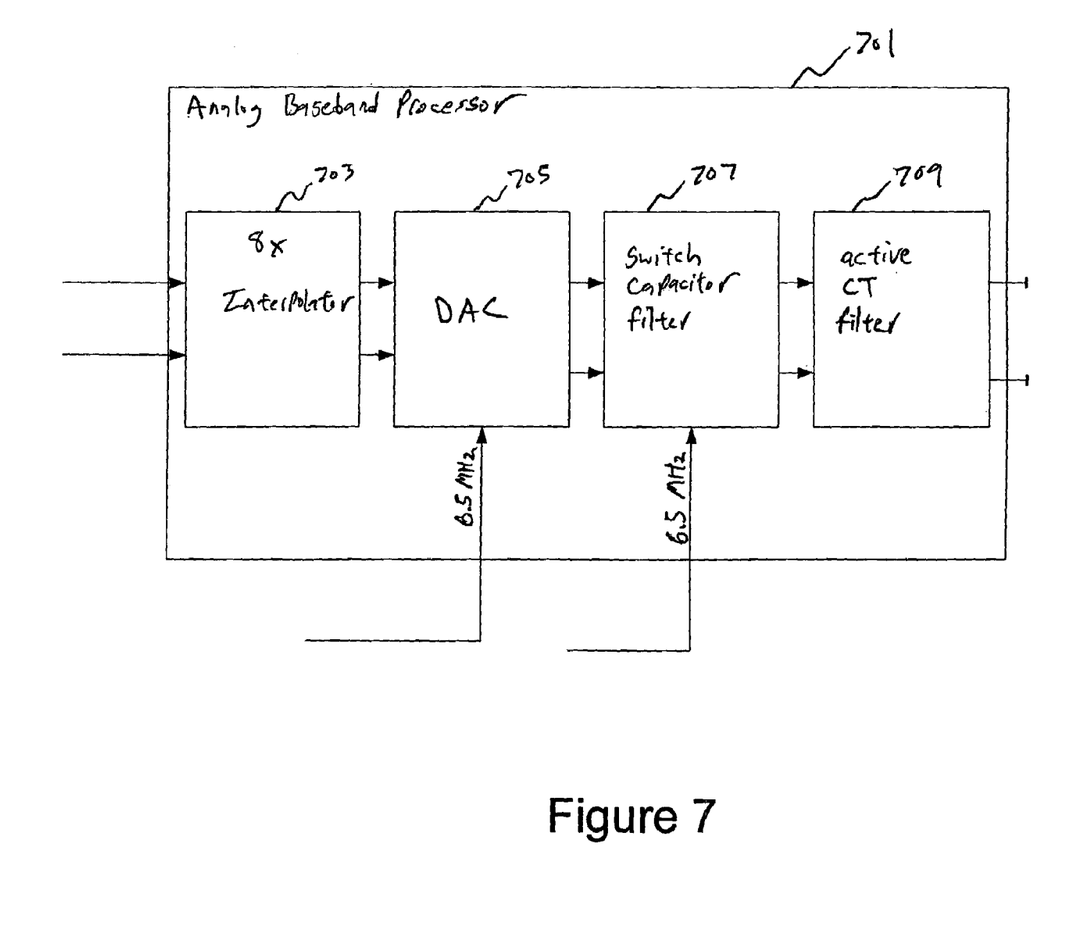
FIG. 7 is a block diagram of an example of the transmission path of a wireless device, suitable for use in embodiments of the invention.

FIG. 7 is a block diagram showing functional components of Analog Baseband Processor 405 in one embodiment of the invention. Analog Baseband processor includes an 8X Interpolator 703, a digital-to-analog converter (DAC) 705, a switched capacitor filter 707, and an active continuous time domain (CT) filter 709. Once the signal is received over interface 407, the signal is processed by 8X interpolator 703 which increases the number of samples per symbol, such that the signal input at a date rate of 812,500 samples/second is increased to 6,500,000 samples/second. This interpolation is performed because DAC 705 is clocked at 6.5 MHz (i.e., by dividing the GSM master clock frequency by a factor of 2). After digital-to-analog conversion, additional filtering is performed on the signal by filters 707 and 709, and the signal is then sent to the radio unit for transmission.

In one embodiment, the functional components 703, 707, 707 and 709 may be implemented in hardware in the analog baseband processor. However, the invention is not limited in this respect, as these functions may be performed by dedicated hardware, software, or any combination thereof.

Although the example described above is directed to using a device designed to operate in a GSM wireless system in a PHS wireless system, the invention is not limited in this respect, as the above-described technique for implementing a transmission path of a wireless system using a device designed to operate with a different wireless system may be employed in any suitable wireless system.

Further, in the example described above, the GSM device is described as using a master clock of 13 MHz to clock interface 407, and the PHS system is described as having a symbol rate of 192,000 symbols/second. However, the invention is not limited to using a master clock of 13 MHz to clock the interface, wherein the data transmitted over the interface has a symbol rate of 192,000 symbols/second. Indeed, any suitable master clock frequency and symbol rate may be used and the invention is not limited in this respect.

Another obstacle that may be encountered when using a wireless device designed to operate in a first wireless system in a second wireless system is that the wireless device may include hardware in the reception path that is not designed for operation in the second wireless system.

Figure 8:
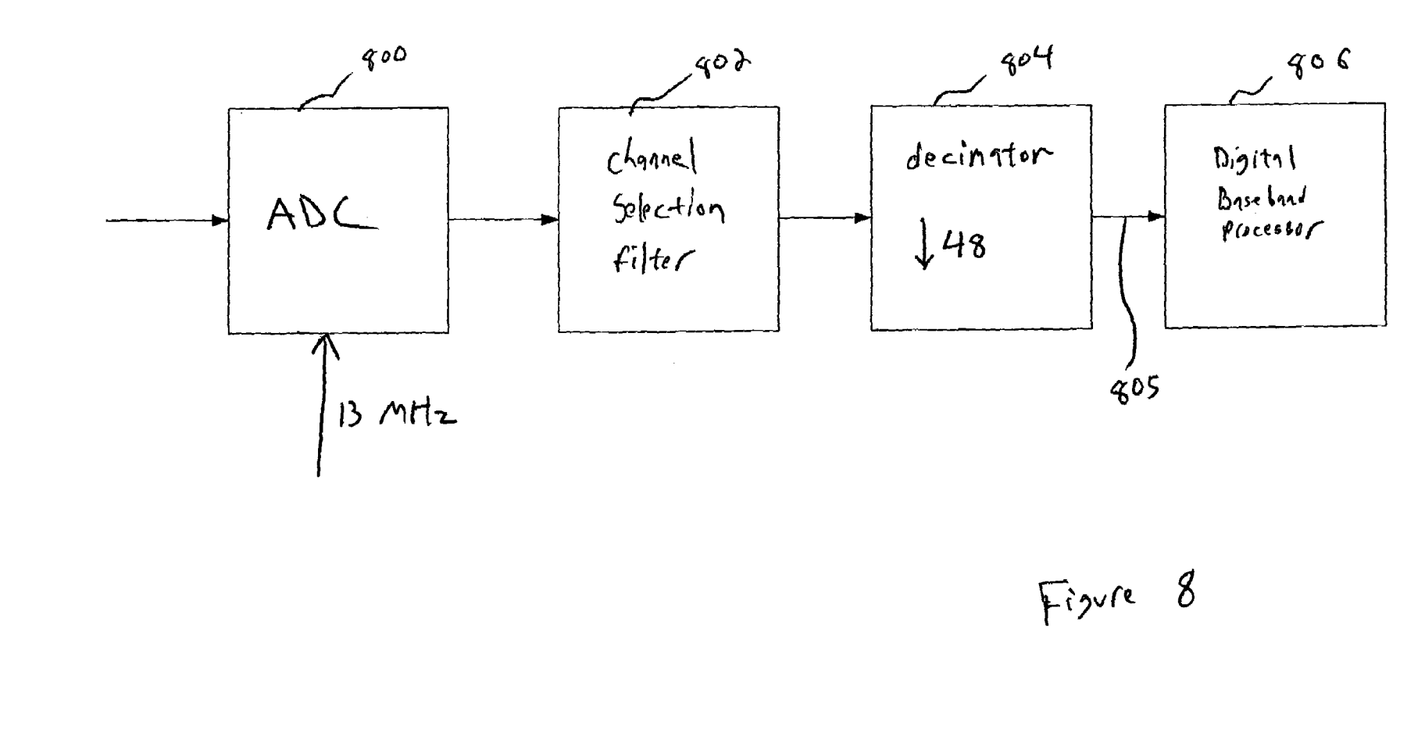
FIG. 8 is a block diagram of an example of a reception path of a wireless device, suitable for use in embodiments of the invention.

For example, as shown in FIG. 8, the reception path of the GSM device may include an analog-to-digital converter 800 that takes as input a received analog signal and converts it to digital form, a channel selection filter 802 which filters out frequency components of a received signal that are not in the frequency band of the wireless system, a decimator 804 which reduces the number of samples in the received signal for subsequent processing, and a digital baseband processor 806 which performs demodulation and detection of the received signal.

As discussed above, in GSM systems the symbol rate is 270.83 kHz. ADC 800 is clocked at the GSM master clock frequency of 13 MHz. As a result, ADC 800 samples the input signal at a rate of 13 MHz (i.e., 13,000,000 samples/sec). As shown in Table 8, sampling a GSM signal with a symbol rate of 270.83 kHz at a rate of 13 MHz, yields 48 samples per GSM symbol.

TABLE 8

$$\frac{13,000,000 \text{ samples/sec}}{270,833 \text{ symbols/sec}} = 48 \text{ samples/symbol}$$

Channel selection filter 802 filters out frequency components of the received signal that are not in the frequency band used by the wireless system and sends the signal to decimator 804. In one embodiment, channel selection filter may be designed to meet the channel selection specifications defined by the GSM wireless standard. Decimator 804 removes the oversampled data added into the signal by ADC 800 by reducing the sampling frequency of the received signal by a factor of 48 to 270,833 samples/sec (i.e., 1 sample/symbol). The digital baseband processor may then process the data sampled at the GSM symbol rate, i.e., 1 sample/symbol.

However, using the GSM receiver path in a PHS wireless system may result in some performance degradation, because the demodulation and detection algorithms used by the PHS wireless system specify a minimal sampling rate of 1.5 samples/symbol. As discussed above the symbol rate used by the PHS wireless system is 192 kHz. A PHS signal may be received by ADC 800 and converted into digital form. As also discussed above, ADC 800 samples the PHS signal at a rate of 13 MHz. As shown in Table 9, this results in 67.7083 samples/PHS symbol.

TABLE 9

$$\frac{13,000,000 \text{ samples/sec}}{192,000 \text{ symbols/sec}} = 67.7083 \text{ samples/symbol}$$

After the oversampled signal is filtered by channel selection filter 802, decimator 804 reduces the number of samples in the signal by a factor of 48 to 1.4105 samples/PHS symbol. In one embodiment, the components 800, 802, and 804 are hardware components. Further, the interface 805 that couples the analog baseband processor to digital baseband process 806 may be clocked at a rate such that the maximum PHS sampling rate that may be transmitted across link 805 is 1.4105 samples/PHS symbol. As mentioned above, this sample/symbol ratio does not meet the 1.5 sample/symbol criterion specified by the PHS wireless standard. However, because the circuit was designed to operate with a GSM wireless system, the link 805 may not support the required minimum PHS sampling rate. This insufficient sampling rate may result in aliasing and inter-symbol interference in the signal in subsequent processing.

Further, as discussed above, channel selection filter 802 may be designed to meet the GSM channel selection specifications and not the PHS channel selection specifications. For example, the PHS wireless standard specifies that the channel selection filter should be a matched filter. That is, in addition to filtering out frequency components outside of the PHS frequency band, the filter also weights signal frequency components based on power, thereby increasing the signal-to-noise ratio. Thus, a matched filter weights the contributions from each filter band proportionally to the signal power so that the frequency response of the filter matches the frequency spectrum of the signal.

However, because channel selection filter 802 is designed to operate in a GSM system, channel selection filter 802 may be an unmatched filter with respect to PHS systems. Using an unmatched filter instead of a matched filter to filter PHS signals may result in a lower signal to noise ratio and may cause a performance degradation when operating the device in a PHS system. As discussed above, digital baseband processor may perform demodulation and detection of received signals. Demodulation is process of removing the carrier signal to obtain the original signal waveform. Detection is the process of extracting the symbols from the baseband waveform.

Detection may be performed either coherently or non-coherently. In coherent detection, an estimate of the channel phase and attenuation is obtained, as well as an estimate of carrier frequency error and timing. This information is used to recondition the received signal, which then may be demodulated to obtain the PHS symbols. By contrast, non-coherent detection does not require channel phase and attenuation estimates, and is thus less complex than coherent detection. Because non-coherent detection is less complex, it may consume less processing resources to perform, but also may result in less accurate detection of the originally transmitted symbols.

The PHS wireless standard specifies using non-coherent detection of PHS wireless signals. However, if instead of performing non-coherent detection, digital baseband processor 806 performs coherent detection, the performance degradation caused by using unmatched filter 802 and an insufficient sampling rate at interface 805 may be compensated for. In one embodiment, this may result in approximately a 2 dB net performance gain in signal-to-noise ratio.

Figure 9:
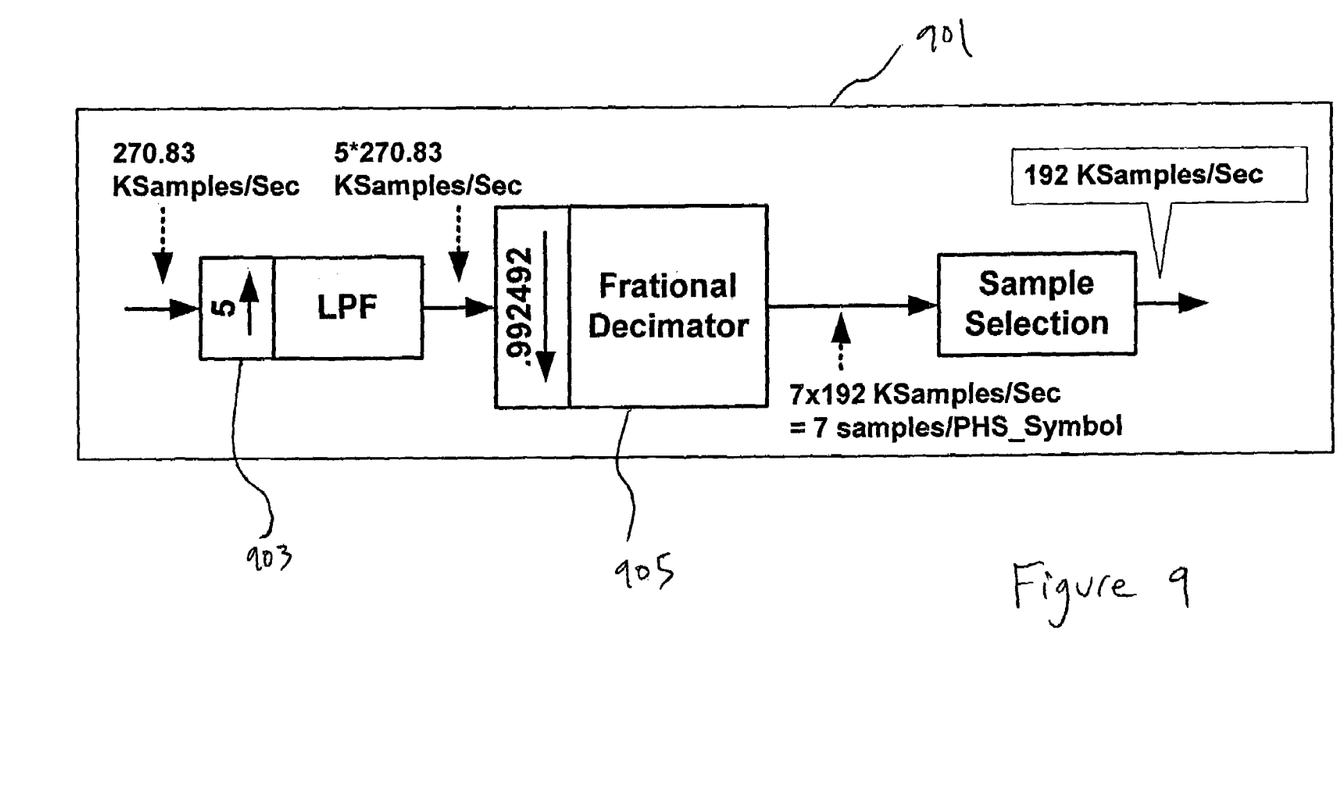
FIG. 9 is a block diagram of the functional units in the reception path of a digital baseband processor, in accordance with one embodiment of the invention.

As discussed above, channel phase and attenuation, carrier frequency error, and timing error may be estimated when performing coherent detection. A greater sampling rate may be used to perform this estimation. For example, as shown in FIG. 9, digital baseband processor 901 receives data at a rate of 270.83 KSamples/Sec, or 1.4105 samples/PHS symbol. However, a data rate of 7 samples/PHS symbol may be used to obtain channel estimates and estimates of carrier frequency and timing error. Thus, the incoming signal may be interpolated by a factor of 5 by interpolator 903 and then decimated by a fractional factor of 0.992492 by fractional decimator 905 so that the output data rate is 7 samples/PHS symbol.

As mentioned above, because a chip designed for operation in GSM systems is being used, an ideal PHS matched filer may not be available. However, the filters inside the digital baseband processor may be designed in such a way that the overall filter, taking into account filters in the analog baseband processor, closely approximates the ideal PHS matched filter. That is, the filters inside the digital baseband processor may perform predistortion of the signal, such that the signal after passing through one or more downstream filters approximates the output of the ideal PHS filter. For example, this predistortion technique may be employed in RRC Filters 505a and 505b shown in FIG. 5. This predistortion technique may also be employed in interpolation filter 903 in FIG. 9. Techniques for performing predistortion are described in greater detail in provisional application titled, "Filters For Communication Systems", assigned attorney docket no. A0312.70551US00, and filed on even date herewith.

In one embodiment of the invention, digital baseband processor 806 may be software programmed to perform coherent detection, as opposed to non-coherent detection. However, the invention is not limited in this respect as digital baseband process may perform coherent detection in any suitable way. For example, digital baseband processor may be hardwired to perform coherent detection.

Various aspects of the present invention may be may be used alone, in combination, or in a variety of arrangements not specifically discussed in the embodiments described in the foregoing and is therefore not limited in its application to the details and arrangement of components set forth in the foregoing description or illustrated in the drawings. The invention is capable of other embodiments and of being practiced or of being carried out in various ways. In particular, various aspects of the present invention may be practiced with processing devices of a number of types, arrangements, architectures and capabilities. No limitations are placed on the device implementation.

In addition, various aspects of the invention described in one embodiment may be used in combination with other embodiments and are not limited by the arrangements and combinations of features specifically described herein. Various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of determining symbol boundaries of a wireless signal of a first wireless system that transmits at a first slot rate, the method comprising acts of:

operating a circuit with a clock signal configured for operation with a second wireless system that transmits at a second slot rate to count a predetermined number of clock pulses of the clock signal to estimate a slot boundary, wherein the frequency of the clock signal is not an integer multiple of the first slot rate.

2. The method of claim 1, wherein the second wireless system operates according to the global standard for mobile communication (GSM) wireless standard.

3. The method of claim 1, wherein the first wireless system operates according to the personal handyphone system (PHS) wireless standard.

4. The method of claim 1, wherein the second wireless system operates with a symbol rate of 270.83 kHz.

5. The method of claim 1, wherein the first wireless system operates with a symbol rate of 192 kHz.

6. The method of claim 1, wherein the clock signal has a frequency of 6.5 MHz.

7. The method of claim 1, wherein the estimated slot boundary is within an acceptable margin of error from an actual symbol boundary.

* * * * *